US009372079B1

United States Patent
Wu et al.

(10) Patent No.: US 9,372,079 B1
(45) Date of Patent: Jun. 21, 2016

(54) OPTICAL PLATE FOR CALIBRATION OF COORDINATE MEASURING MACHINES

(71) Applicants: Tay-Chang Wu, Tucson, AZ (US); Jaime Duran, Tucson, AZ (US); John Christopher Boney, Tucson, AZ (US); Shawn David McDermed, Tucson, AZ (US); Joanna Schmit, Tucson, AZ (US); Son Hoang Bui, Tucson, AZ (US); Matthew Jarrod Novak, Tucson, AZ (US)

(72) Inventors: Tay-Chang Wu, Tucson, AZ (US); Jaime Duran, Tucson, AZ (US); John Christopher Boney, Tucson, AZ (US); Shawn David McDermed, Tucson, AZ (US); Joanna Schmit, Tucson, AZ (US); Son Hoang Bui, Tucson, AZ (US); Matthew Jarrod Novak, Tucson, AZ (US)

(*) Notice: Subject to any disclaimer, the term of this patent is extended or adjusted under 35 U.S.C. 154(b) by 84 days.

(21) Appl. No.: 14/582,534

(22) Filed: Dec. 24, 2014

(51) Int. Cl.
*G01B 5/008* (2006.01)
*G01B 21/04* (2006.01)
*G01B 11/00* (2006.01)

(52) U.S. Cl.
CPC ............ *G01B 21/042* (2013.01); *G01B 11/005* (2013.01)

(58) Field of Classification Search
CPC ............................ G01B 21/042; G01B 11/005
USPC ..................................................... 33/502, 503
See application file for complete search history.

(56) References Cited

U.S. PATENT DOCUMENTS

| | | | | |
|---|---|---|---|---|
| 4,914,828 A * | 4/1990 | Fiedor | ................... | G01B 7/345 33/551 |
| 6,493,956 B1* | 12/2002 | Matsuda | ............... | G01B 21/042 33/502 |
| 2007/0176130 A1* | 8/2007 | Weingaertner | ....... | G01B 21/042 250/559.38 |
| 2009/0010560 A1* | 1/2009 | Chen | .................. | G01B 11/2441 382/255 |
| 2009/0073458 A1* | 3/2009 | Heiden | ................ | G01B 11/005 356/500 |
| 2010/0020332 A1* | 1/2010 | Boesser | ................ | G01B 11/03 356/500 |
| 2010/0302366 A1* | 12/2010 | Zhao | .................. | B23Q 17/2233 348/142 |
| 2013/0125269 A1* | 5/2013 | Su | ........................... | G01Q 30/00 580/8 |
| 2014/0059914 A1* | 3/2014 | Sammut | .................... | F41G 1/38 42/122 |
| 2014/0268178 A1* | 9/2014 | Atwell | .................. | G01B 11/24 356/614 |
| 2015/0226539 A1* | 8/2015 | Roeth | .................. | G01B 11/005 356/614 |
| 2015/0285608 A1* | 10/2015 | Singh | ..................... | G01B 5/008 33/503 |
| 2016/0116275 | * | 4/2016 | Matsushita | .......... G01B 21/042 702/95 |

* cited by examiner

*Primary Examiner* — G. Bradley Bennett
(74) *Attorney, Agent, or Firm* — Antonio R. Durando

(57) ABSTRACT

A coordinate measuring machine is calibrated by taking optical measurements of an optical flat that includes a grating placed on its surface. The arm of the CMM capable of multi-directional translation in relation to an object is fitted with a white-light interferometric objective and optical measurements are taken of the flat while translating the objective (or the flat) in the coordinate direction subject to calibration. The objective may serve also as the probe of the CMM.

18 Claims, 13 Drawing Sheets

OPTICAL PLATE FOR CALIBRATION OF COORDINATE MEASURING MACHINES

BACKGROUND OF THE INVENTION

1. Field of the Invention

The invention relates in general to calibration of coordinate measuring machines. In particular, it relates to calibration performed by optical measurements using an optical flat.

2. Description of the Related Art

A coordinate measuring machine (CMM) is a device for measuring the physical geometrical characteristics of an object, typically for quality control purposes in manufacturing and assembly processes. The typical CMM is composed of three axes (X, Y, Z), orthogonal to each other in a typical three-dimensional coordinate system. The first horizontal axis (typically the Y axis) is defined by a bridge or gantry supported by two vertical legs coupled to a stationary support table. The second axis, X, is defined by the horizontal motion of the bridge along the support table in the direction normal the first axis (thereby defining an XY plane). The third, Z axis is defined by the vertical motion of a quill or spindle attached to the bridge. A probe is attached to the quill for contact or optical measurements of a part based on a scale system that indicates the location of the probe along each axis. In operation the machine reads the input from the probe as it traces the part at various points and the X,Y,Z coordinates of these points are used to determine size and shape with micrometer precision. The typical CMM takes readings in six degrees of freedom and displays these readings in mathematical form. For the purposes of this disclosure the mechanism providing the three dimensional motion of the probe in relation to the sample part (or vice versa) is defined as the carriage mechanism of the CMM.

Of course, the motion of the probe along each axis is not perfect and six main errors are associated with each straight-line motion. As illustrated in FIG. 1 with reference to the Y axis, for example, these errors are identified in the art as the linear or scale positioning error (indicating that the probe does not move the measured distance along the axis), the two straightness errors (the probe moves up/down or left/right with respect to axis), the pitch error (angular front/back motion), the roll error (angular left/right motion), and the yaw error (rotation around the Z axis). In addition, three so-called squareness errors relate to the alignment among the three axes. Thus, a total of 21 errors may be introduced by the mechanical translation of the probe during the measurement of an object. Therefore, the ability to estimate these errors and correct the results of measurements through calibration of the coordinate measuring machine or otherwise is essential in the operation of CMMs.

With the advent of laser interferometry, it has become possible to calibrate coordinate measuring machines to the degree required to correct nano-scale errors. For example, laser interferometers available commercially from manufacturers such as Agilent and Renishaw (Products No. ML10 and No. XL-80) are equipped to measure pitch, yaw, straightness, and linear errors (roll errors cannot be calibrated with laser interferometry). Squareness errors can also be calculated from data obtained through laser interferometry, but typically they are obtained from so-called "ball bar" or "length bar" measurements, which are simpler, less expensive and more accurate, and thus preferred. In all cases, optimal error correction of CMMs is achieved by providing a total of 21 error parameters (six for each coordinate axis plus three for squareness) that are then used to calibrate the machine and correct the measurement results.

The operation of laser interferometers in the context of CMM error calibration and correction and the attendant mathematical formulation of the results of error measurements are well known in the art. Therefore, they are not described here. For reference, see U.S. Pat. No. 4,819,195 and U.S. Pat. No. 4,939,678, and G. Zhang et al., *Error Compensation of Coordinate Measuring Machines*, CIRP Annals, Volume 34, Issue 1, pp. 445-448 (1985), herein incorporated by reference. Because of the precision afforded by such optical measurements, the use of laser interferometry has become the conventional approach where high precision is required. However, such interferometers are relatively large pieces of equipment that are complicated to use for CMM calibration and are not suited for measuring errors of smaller CMMs having a typical working space in the order of centimeters. This invention is directed at a novel approach for calibration and error correction of coordinate measuring machines based on the use of an optical flat in combination with an optical topography probe for 3-D measurements, such as an interferometric microscope objective.

BRIEF SUMMARY OF THE INVENTION

The invention lies in the realization that the information required for calibration of a CMM can be obtained simply by taking optical measurements of an optical flat that includes an appropriate recognizable pattern, such as a grating, placed on its surface. The arm of the CMM capable of multi-directional translation in relation to an object placed on the target stage is fitted with a 3-D optical probe, such as a white-light interferometric objective. The optical flat is placed on the target stage of the CMM and optical measurements are taken of the flat while translating the objective in the coordinate direction subject to calibration. It is understood that the same can be achieved in a system where the objective is held stationary and the flat is translated by a stage capable of multi-directional translation in relation to the objective.

When measuring the linear positioning error of a coordinate axis of the coordinate measuring machine, the optical plate is positioned with the grating aligned with that coordinate axis and preferably perpendicular to the illumination beam produced by the objective. The grating is translated relative to the objective along the coordinate axis of interest while acquiring successive optical measurements of the grating. Then the distance traveled during such relative translation is calculated based on translation positions identified by processing the successive optical measurements of the grating. Finally, the linear positioning error along the coordinate axis of interest is identified by comparing the distance so calculated with the corresponding measurement along the coordinate axis produced by the CMM.

To measure the straightness error of a coordinate axis of the CMM, the optical plate is placed on a plane parallel to the coordinate axis of interest and perpendicular to the illumination beam produced by the objective, such that the beam is focused on an area of the plate's surface that does not contain the grating. The plate is then translated relative to the objective along the coordinate axis of interest and successive interferometric measurements are acquired to calculate the distance between the optical axis of interest and the plate at each acquisition point during the translation procedure. The straightness error of the coordinate axis of interest in the direction perpendicular to the plate is then identified by comparing the distance measurements so calculated with the corresponding measurements produced by the coordinate measuring machine during the same translating step.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE PREFERRED EMBODIMENTS OF THE INVENTION

Figure 1:
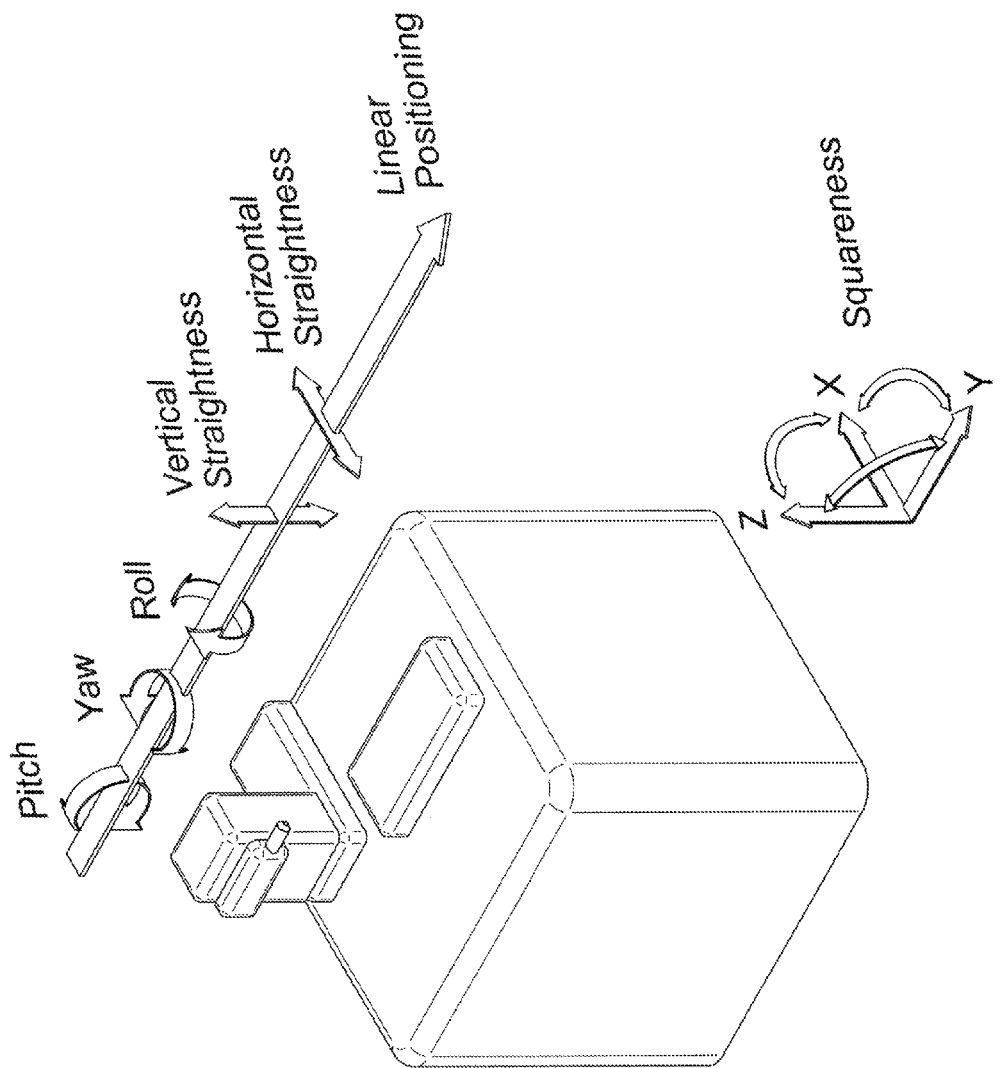
FIG. 1 is a drawing showing the definitions used in the art for the 21 errors associated with the three axes of a conventional coordinate measuring machine.

The invention is described with reference to a white-light interferometric objective, but it is understood that the same principles apply with the use of any optical topography probe that can be utilized to take three-dimensional measurements of an object. As used herein, "optical topography probe" is intended to refer, without limitation, to any of the following instruments and techniques: confocal, chromatic confocal, focus variation, light sheet microscopy, white light interferometry, coherence scanning interferometry, optical coherence tomography, multiple wavelength interferometry, spectral interferometry, moiré methods, wavelength scanning interferometry, phase-shifting interferometry, lateral scanning interferometry, carrier phase-shifting interferometry, digital holography, fringe projection, structured light illumination, and speckle techniques.

The invention is based on the recognition that an optical flat can be used in combination with a white-light interferometric objective to provide 18 of the 21 parameters required for error correction of a coordinate measuring machine. In addition, since such objective can itself be used as an optical probe, the apparatus of the invention can provide a self-contained system both for CMM measurements and calibration. Because the optical flat can be as thin as necessary for placement in the working space of a small CMM, the invention is particularly well suited for implementation in machines dedicated to the measurement of relatively small objects, such as stents for medical applications, for example. The invention is described in detail below as a CMM where the probe consists of the white-light interferometric objective that is also used for calibration and the stage of the CMM is a platform that can be translated along X,Y,Z axes.

As used herein, the terms optical "plate" and "flat" are used interchangeably, as customary in the art. "Translate" and related terms are used to indicate the relative motion between two parts, while "scan" and related terms are used to indicate the motion of an optical probe (such as an objective) relative to a target surface (or vice versa) for the purpose of acquiring optical data, as also customary in the art. "Calibration" and "error correction" are also used interchangeably in relation to the CMMs that are the subject of the invention. The X,Y,Z coordinate symbols are used conventionally to refer to three orthogonal axes where the X and Y directions are horizontal and the Z direction is vertical. The directions of two axes are shown in each figure, the third axis being perpendicular to the figure.

Referring to the figures, they are exemplary schematic representations of the spatial relationship between the objective and the optical plate of the invention used to carry out the various measurements disclosed below based on an objective positioned horizontally along the Y axis and illuminating a movable stage. The objective can be scanned horizontally along the Y axis for interferometric measurements and the stage can be translated along three axes, as mentioned above, and rotated along two planes. However, those skilled in the art will recognize that other configurations are possible and equally valid so long as enabling the measurements described in relation to each axis of a CMM. For example, in a setup where the objective directs the light beam vertically downward, all figures would be rotated accordingly.

Figure 2:
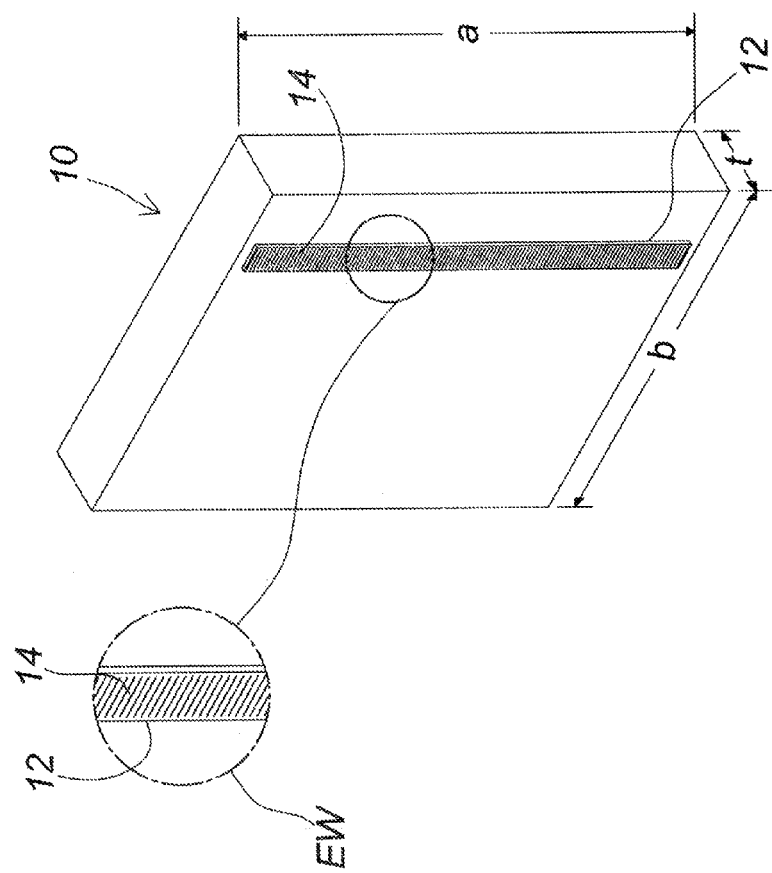
FIG. 2 is a perspective view of an optical flat with a grating bonded to its surface for use in CMM calibration and error correction according to the invention.
Figure 3:
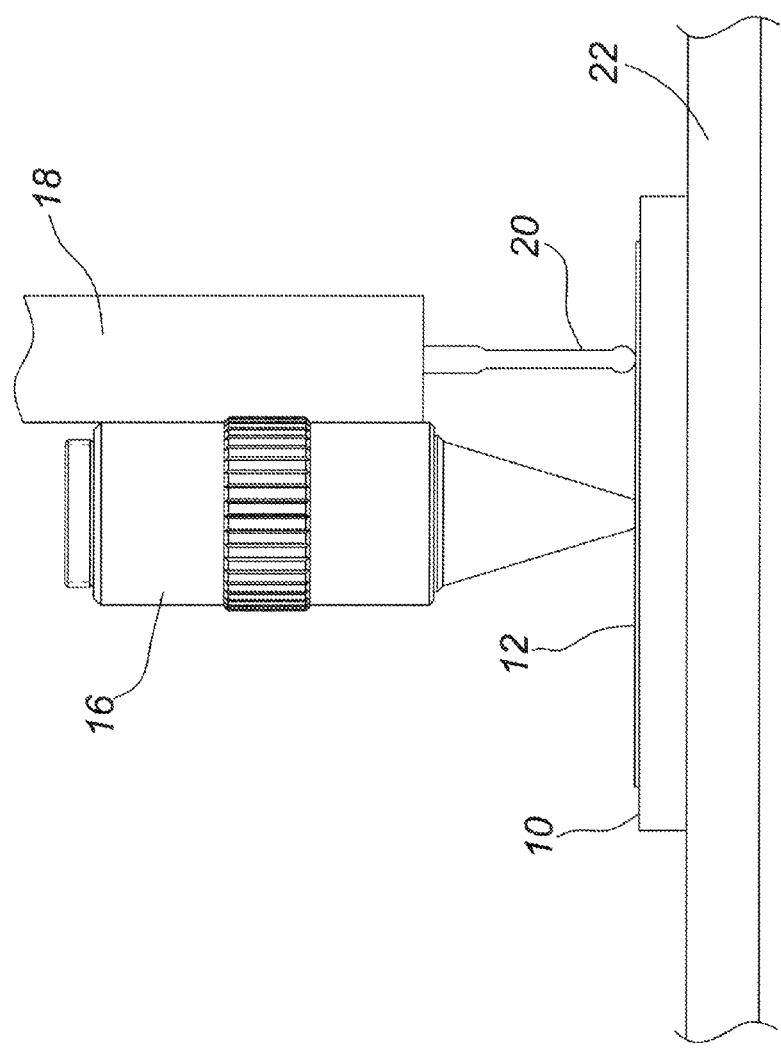
FIG. 3 is a schematic representation of a CMM with an interferometric objective rigidly attached to the CMM's probe arm.

FIG. 2 illustrates an optical flat 10 suitable for practicing the invention. In the preferred embodiment, the optical flat 10 has dimensions a=100 mm, b=80 mm and t=15 mm, with a flatness measurable within 0.1 micron of perfection. This size and degree of flatness of the optical plate are suitable to calibrate with high accuracy a CMM with a working volume of about 100×100×50 mm$^3$. A thin steel grating plate 12, as thin as 0.2 mm, is bonded to one surface the optical flat 10, as seen in the enlarged partial view EW in the figure. The lines 14 of the grating define a scale preferably aligned along the longer dimension of the flat ("a" in FIG. 2). As so modified, the plate 10 is used for CMM calibration in conjunction with a conventional white-light interferometric objective 16 that either also serves as the CMM probe or is mounted on the probe arm 18 of the coordinate measuring machine to be calibrated, as illustrated schematically in FIG. 3. In this case the objective 16 would be coupled rigidly to the CMM probe arm 18 so as to move with high precision with the probe 20 of the machine, such that any motion of the probe 20 with respect to a target object in the CMM also produces the same exact motion of the interferometric object 16 with respect to the object. The plate 10 is positioned on the CMM's stage 22 as the target object and various measurements are taken from the plate while the objective scans it in predetermined directions in conventional manner (with the contemporaneous exact same motion of the probe 20).

The plate 10 of the invention is not used to measure squareness errors. Therefore, the parameters for squareness calibration may be derived, either with the objective 16 or with an external laser interferometer, from the "ball bar" or "length bar" standards commonly used in the art. However, the optical plate 10 provides a simple and rapid framework with which to calculate the error parameters corresponding to the remaining 18 sources of error (linear positioning, horizontal straightness, vertical straightness, pitch, yaw and roll for each axis) with only nine measurements. These measurements provide all the information required to calculate the 18 parameters needed for calibration and error correction using conventional processing algorithms. Each such measurement is described below, it being understood that alternative approaches may be adopted using an optical plate as described herein. For example, the grating 12, illustrated in the figures and described as a thin metallic structure bonded to the flat 10, could instead be a pattern etched or engraved into the optical plate. The pattern could also be different from that of a grating, so long as recognizable optically and characterized by features separated by an exactly known distance.

Referring to the measurement of X,Y,Z positioning errors, the equally spaced, parallel lines 14 of the grating 12 are used as a reference to measure the actual linear motion of the probe 20 relative to the optical flat 10 (or vice versa). The difference between the CMM measurement and the optical measurement along each of the X,Y,Z axes represents the corresponding linear positioning error for that axis. Modern CMMs are accurate to a few microns. Therefore, choosing a grating with a pitch of 20.0 micron (for example), which can be implemented with an error no more than 0.25 micron per 100 mm of linear dimension, the sum of the uncertainties produced by the grating and the machine is smaller than half the pitch. As a result, it is always possible to identify with certainty the position of the objective relative to the grating. The difference between the linear distance measured by the optical system focusing on the grating when the flat 10 is translated relative to the probe 20 along a coordinate axis and the linear distance reported by the CMM represents the linear positioning error along that axis.

Figure 4:
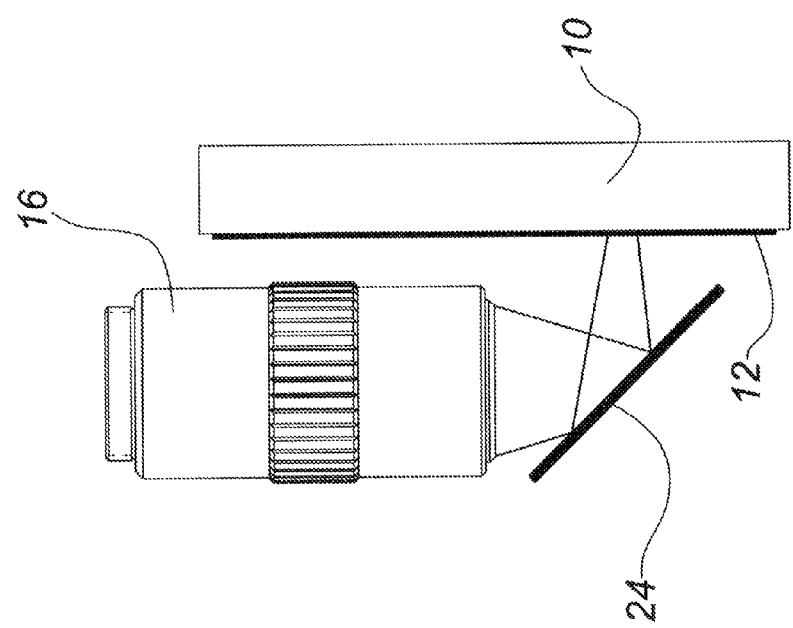
FIG. 4 is a schematic representation of an interferometric objective that includes a folding mirror to orient the interferometric beam at 90-degree angles.
Figure 5:
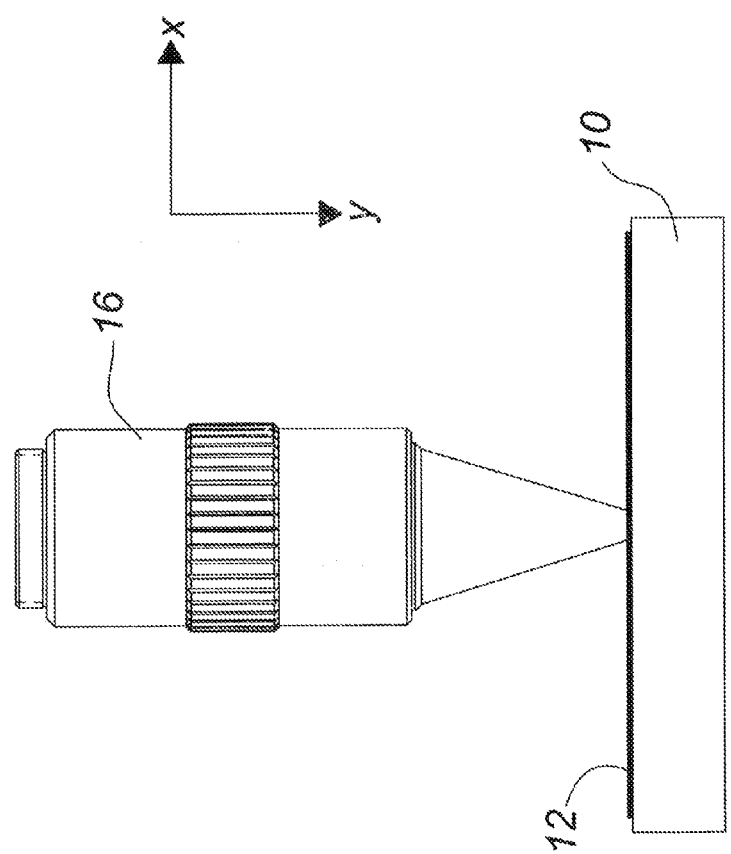
FIG. 5 is a schematic top-view illustration of a setup suitable for measuring the linear positioning error of the X axis using the optical plate and grating of the invention in a CMM having an optical measurement probe.
Figure 6:
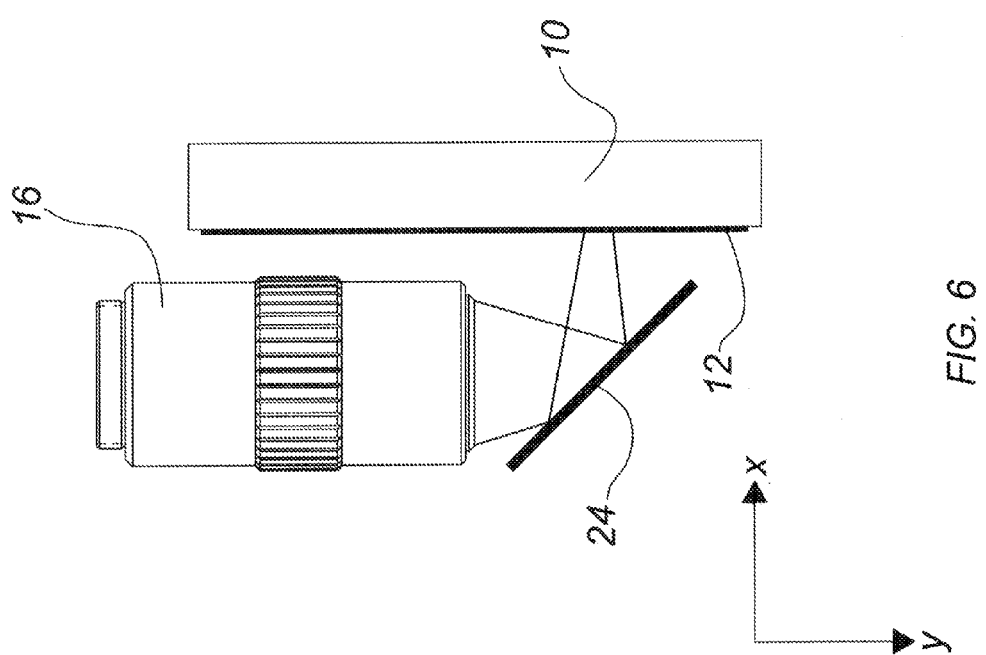
FIG. 6 is a schematic top-view illustration of a setup suitable for measuring the linear positioning error of the Y axis of the CMM using the optical plate and grating of the invention.
Figure 7:
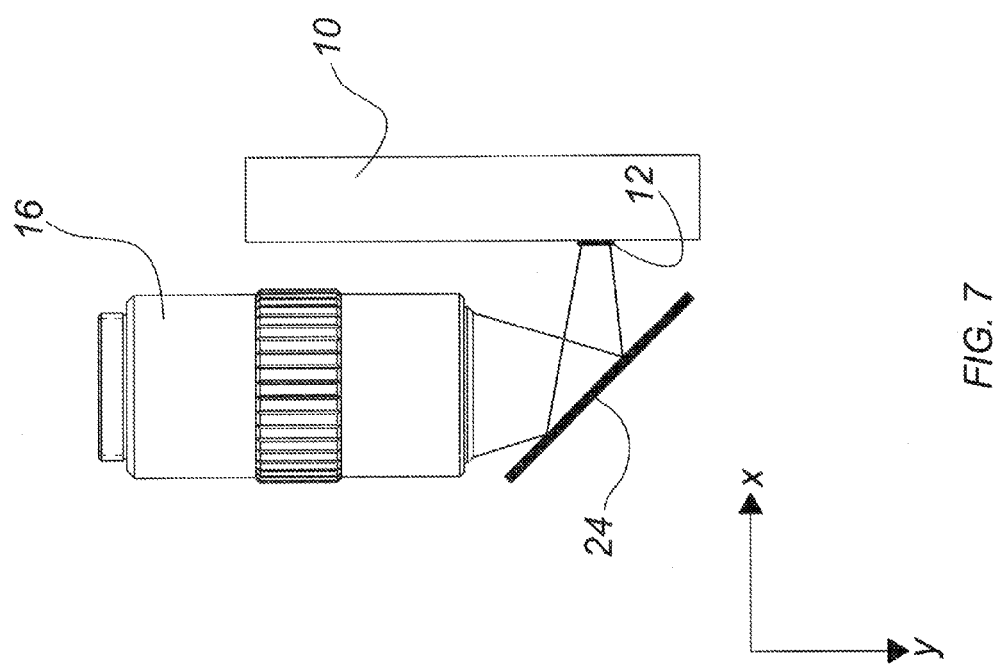
FIG. 7 is a schematic top-view illustration of a setup suitable for measuring the linear positioning error of the Z axis of the CMM using the optical plate and grating of the invention.

Based on the foregoing, each linear positioning measurement is conducted with the objective 16 focusing its beam on the grating 12 of the optical flat 10. If direct illumination is not possible because the plate 10 cannot be aligned with the objective 16 (in the case where the objective is also the CMM probe) or when the objective 16 cannot be coupled to the probe arm 18 of a separate CMM to illuminate the measurement surface directly from all X,Y,Z directions, a folding mirror 24 is used, as shown schematically in FIG. 4. Obviously, the mirror 24 would be oriented as necessary to illuminate the target, such as the grating 12 of the optical plate 10. The grating is placed in all cases parallel to the axis of travel. Accordingly, to measure the linear positioning error of the X axis of the CMM, the optical flat 10 must be positioned on either the XY plane or the XZ plane with the scale 14 of the grating 12 aligned with the X direction. For example, assuming an objective 16 illuminating horizontally in the Y direction, FIG. 5 shows schematically in top view a configuration for direct illumination where the optical flat 10 is positioned on its long side (X direction) on the XZ plane with the grating 12 facing the Y axis for taking linear positioning measurements in the X direction. Similarly, FIG. 6 shows schematically a configuration for folded illumination where the optical flat 10 is positioned with its long side in the Y direction on the YZ plane with the grating 12 facing the X axis for taking linear positioning measurements in the Y direction. FIG. 7 shows schematically a configuration for folded illumination where the optical flat 10 is rotated 90 degrees and is positioned on its short side on the YZ plane with the scale of the grating 12 facing the X axis for taking linear positioning measurements in the Z direction (perpendicular to the plane of the figure).

In all three cases the linear positioning parameter is obtained with an optical measurement based on recognizing the exact position of the objective 16 relative to the scale of the grating 12. An initial irradiance measurement (a digital image) of the grating is taken at an initial position and corresponding coordinates for the objective and probe of the CMM are recorded. The average irradiance for the image is calculated in some manner and also recorded. Then, successive irradiance measurements of the grating 12 are taken as the objective 16 is translated in relation to the optical plate 10 (or vice versa). At each step, the local irradiance measurement is combined with the initial irradiance measurement and the average irradiance of the combined image is calculated. Inasmuch as each successive combined image represents the overlap of two images of the grating 12, the average irradiance of the combined images will be smaller than the average irradiance of the initial image (because of the moiré effect produced by the overlap). In fact such average irradiance will be at a maximum only when the combined image reflects the combination of two coextensive images (that is, the lines 14 of both grating images substantially coincide). This effect is used advantageously to measure the actual relative translation between the objective and the grating by identifying positions of maximum average irradiance. This can be done, for example, by plotting average irradiance versus position for successive measurements, fitting a sinusoidal curve to the data (which is known to be a sinusoidal curve), and finding the maxima on the plot. Since each maximum on the plot corresponds to a shift of one grid in the motion of the plate 10 relative to the objective 16 (or vice versa), by counting the number of grids shifted from the initial position it is possible to determine the corresponding total translation from the initial position. The total translation is then compared to the corresponding measurement recorded by the CMM to determine the linear positioning error.

As explained above, because of the micron accuracy of modern CMM machines, using a grating with a pitch of 20.0 micron and a maximum error of 0.25 microns per 100 linear millimeters, the uncertainties produced by the grating plus the error produced by the CMM are normally less than half the pitch (10 micron). Therefore, the sinusoidal cycle corresponding to any given measurement (and correspondingly the total number of pitches traveled during the translation) can always be identified with certainty. The difference between the linear distance measured by the optical system focusing on the grating and the linear distance reported by the CMM represents the linear positioning error along the axis. The measurements are illustrated with a perpendicular illumination beam shining on the grating, but those skilled in the art understand that these measurements of the invention could be carried out as well with a beam positioned at an angle with respect to the grating so long as the grating is in a fixed and known position in relation to the objective.

It is noted that the objective 16 used to illustrate the invention is an interferometric objective but it has been described as taking only irradiance measurements for the purpose of acquiring X,Y,Z linear positioning error data. In fact, the reference beam could be blocked for these measurements, but its contribution to the beam reaching the detector does not alter materially the relative irradiance data acquired between measurements. Therefore, the interferometric objective is suitable for acquiring the sequences of images described above. Alternatively, height measurements (that is, the topography of the grating) can be taken (interferometrically or otherwise) instead of irradiance. In such case the grating pattern is identified by recognizing that the measured height is maximum at the grating lines and minimum in the groove/trench spaces between lines. The remaining error parameters (straightness, roll, pitch and yaw) are calculated by acquiring interferometric data, as detailed below.

Figure 8:
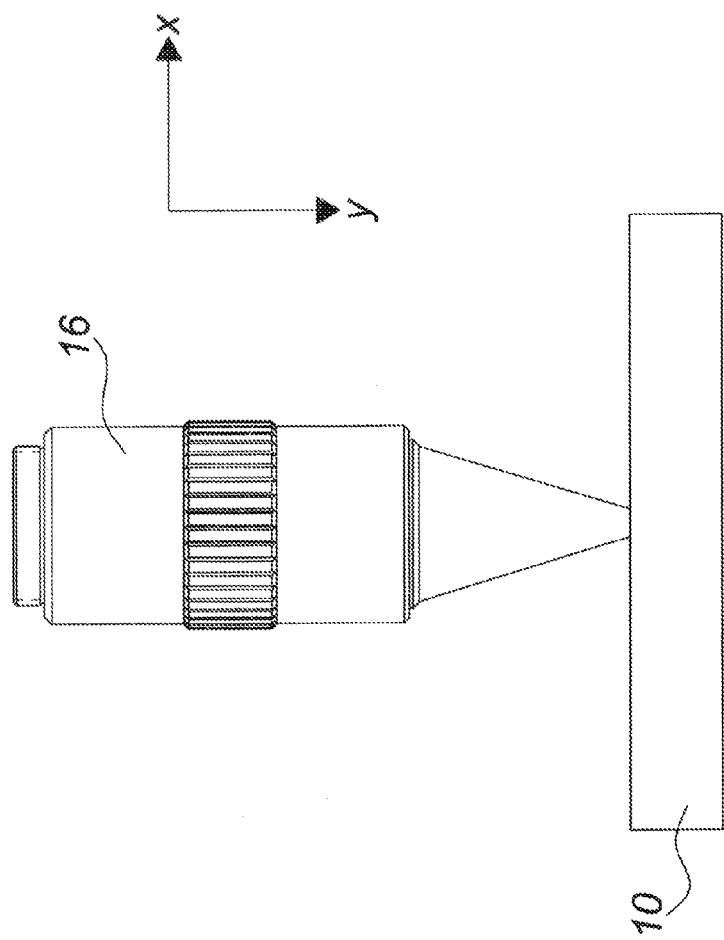
FIG. 8 is a schematic top-view illustration of a setup suitable for measuring the horizontal straightness error of the X axis of the CMM using the optical plate of the invention.

The measurements of horizontal and vertical straightness are carried out in a similar fashion with the optical flat 10 of the invention, but interferometric measurements, rather than simple image acquisition, are made along the clear surface of the flat (i.e., where no grating is present). For example, to measure the horizontal straightness of the X axis with the same objective 16 described with reference to the linear error measurements, the measurement surface (i.e., a portion of the plate 10 without the grating 12) of the optical flat is placed on the XZ plane facing the Y direction, as shown in FIG. 8. The objective is then used to perform white-light interferometric scans at various points as it is translated relative to the plate 10 along the X direction. At each data acquisition point, the objective 16 is scanned through focus in the Y direction to find the exact Y position of the point in conventional manner. If the X axis of the CMM is precise, with no horizontal straightness error, all measurements will be the same. If they are not, the difference between measurements represents the horizontal straightness error at each point.

Figure 9:
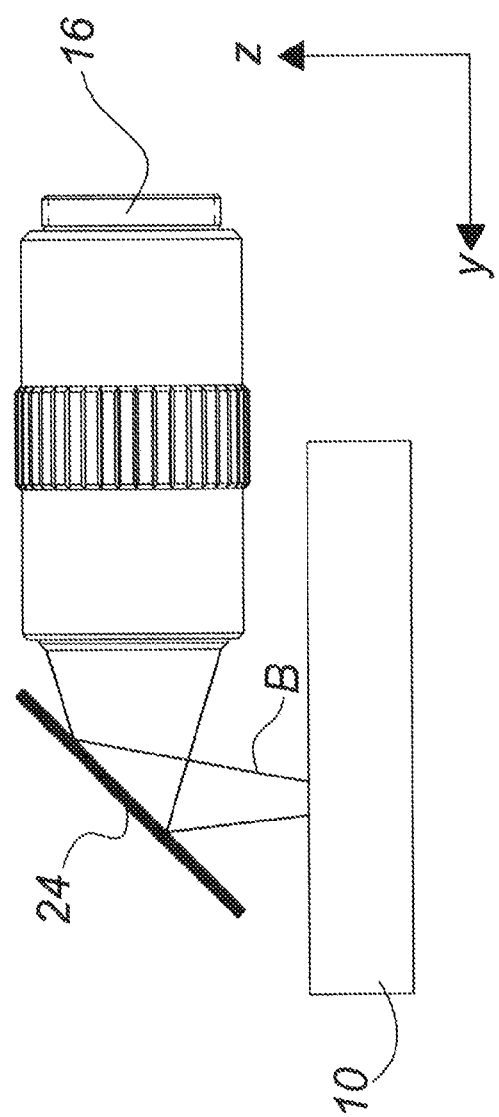
FIG. 9 is a schematic side-view illustration of a setup suitable for measuring the vertical straightness error of the X axis of the CMM using the optical plate of the invention.

The measurements of vertical straightness of the X axis is carried out in a similar fashion, but with the clear portion of the optical flat 10 lying flat on the XY plane and receiving the interferometric beam B from the objective downward through the folding mirror 24, as shown schematically in the side view of FIG. 9. Interferometric measurements are taken at various points as the objective is translated relative to the plate along the X direction (that is, in the direction normal to the plane of the figure). (Note that the plate 10 is shown positioned with its longer side aligned with the X axis, but the only critical issue is that it be placed on the XY plane with sufficient length to cover the X translation required for the measurement.) At each point, the objective is scanned through focus in the Z direction to find the exact Z position of the point in conventional manner. If the motion along the X axis of the CMM produces no vertical straightness error, all measurements will be the same. If they are not, the difference between measurements represents the vertical straightness error at each point.

Figure 10:
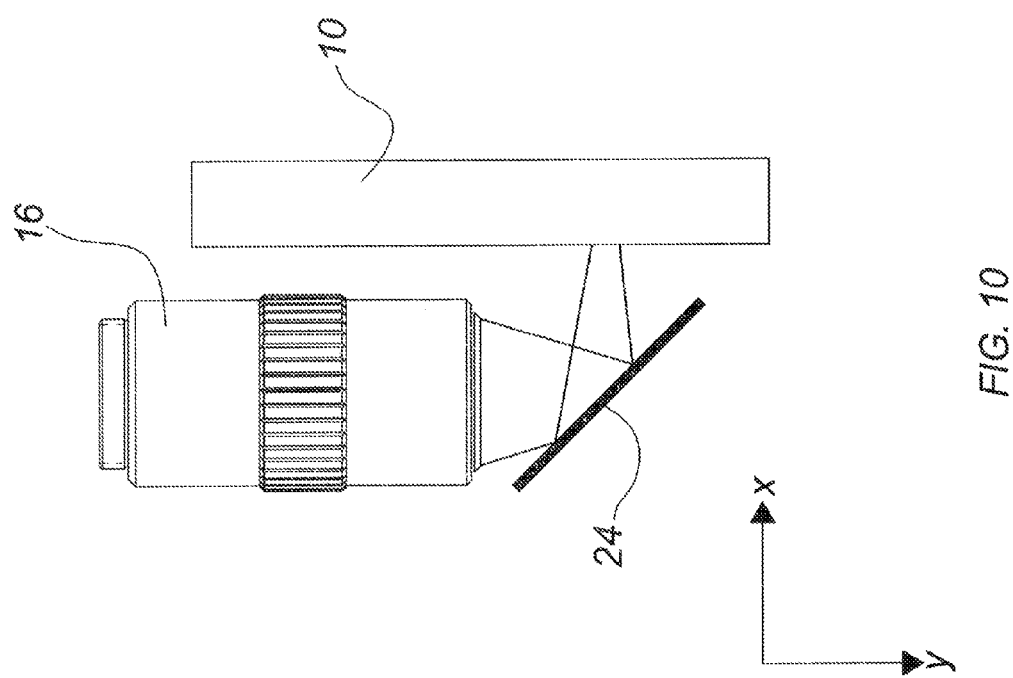
FIG. 10 is a schematic top-view illustration of a setup suitable for measuring the horizontal straightness error of the Y axis of the CMM using the optical plate of the invention.

The measurements of horizontal and vertical straightness of the Y axis are similarly carried out interferometrically with a clear portion of the optical flat 10. To measure the horizontal straightness of the Y axis, the flat is placed on the YZ plane facing the X direction, as shown in the top view of FIG. 10. The objective 16 is then used with the folding mirror 24 to perform white-light interferometry at various points as it is translated along the Y direction relative to the plate 10. At each point, the objective is scanned through focus in the X direction (again through the mirror 24 that folds the Y direction of scanning of the objective) to find the exact X coordinate of the point in conventional manner. If the Y axis of the CMM is precisely straight in the horizontal direction, all measurements will be the same. If they are not, the difference between measurements represents the horizontal straightness error at each point.

Figure 11:
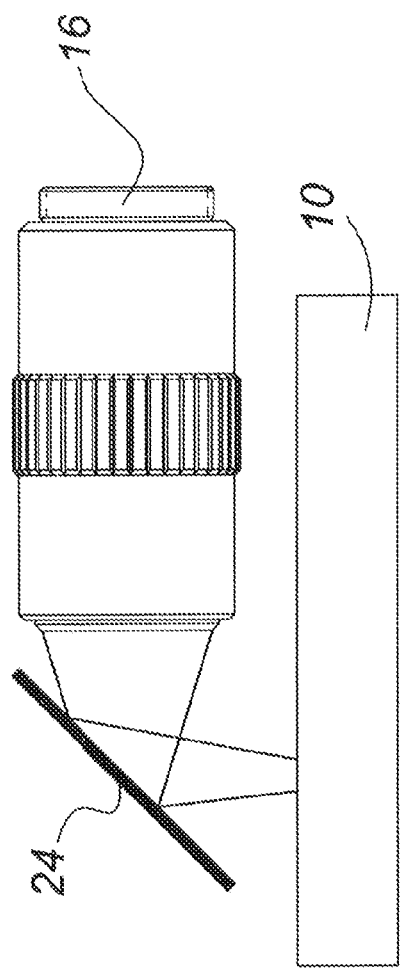
FIG. 11 is a schematic side-view illustration of a setup suitable for measuring the vertical straightness error of the Y axis of the CMM using the optical plate of the invention.

The measurements of vertical straightness of the Y axis are carried out the same way as for the X axis, but with the clear portion of the optical flat 10 lying flat on the XY plane and receiving the interferometric beam B from the objective 16 downward through the folding mirror 24. However, the interferometric measurements are taken at various points as the objective is translated relative to the plate along the Y direction, as shown schematically in the side view of FIG. 11. At each point, the objective is scanned through focus in the Z direction to find the exact Z position of the point in conventional manner. If motion along the Y axis of the CMM produces no vertical straightness error, all measurements will be the same. If they are not, the difference between measurements represents the vertical straightness error at each point.

Figure 12:
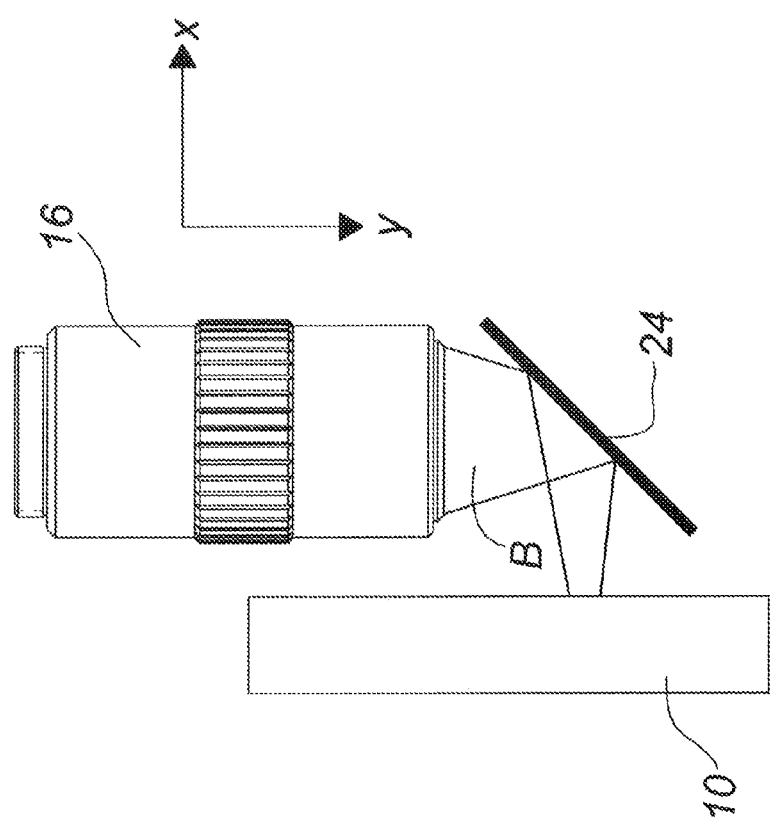
FIG. 12 is a schematic top-view illustration of a setup suitable for measuring the X-direction straightness error of the Z axis of the CMM using the optical plate of the invention.

The measurements of straightness of the Z axis in the X and Y directions are also carried out interferometrically with a clear portion of the optical flat 10. To measure the straightness of the Z axis in the X direction, the flat is placed on the YZ plane facing the X direction, as shown in top view on FIG. 12. The beam B from the horizontal objective 16 is directed to the plate 10 to perform white-light interferometry at various points as the objective 10 is translated along the Z direction (i.e., orthogonal to the plane of the figure) relative to the plate 10. At each point, the objective is scanned in the X direction through focus to find the exact X position of the point in conventional manner. If the Z axis of the CMM is precisely straight in the X direction, all measurements will be the same. If they are not, the difference between measurements represents the X straightness error at each point.

Figure 13:
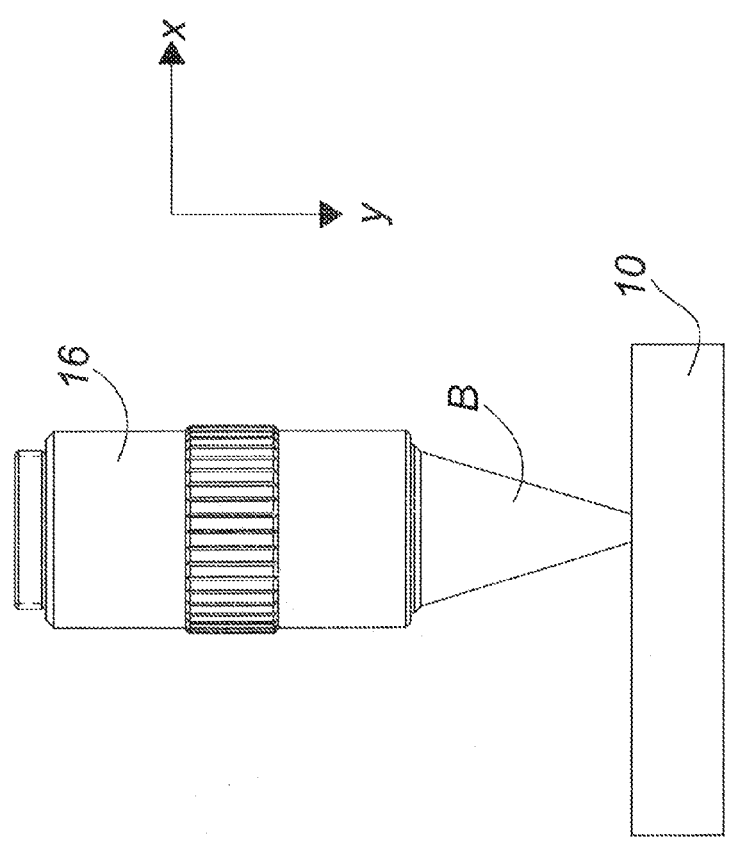
FIG. 13 is a schematic top-view illustration of a setup suitable for measuring the Y-direction straightness error of the Z axis of the CMM using the optical plate of the invention.

The measurements of straightness of the Z axis in the Y direction is carried out the same way, but with the clear portion of the optical flat 10 laying on the XZ plane and receiving the interferometric beam B from the objective 16 in the Y direction, as shown schematically in FIG. 13. The interferometric measurements are taken at various points as the objective is translated relative to the plate along the Z direction. At each point, the objective is scanned in the Y direction through focus to find the exact Y position of the point in conventional manner. If the motion along the Z axis of the CMM produces no straightness error in the Y direction, all measurements will be the same. If they are not, the difference between measurements represents the Y straightness error at each point.

Once these measurements have been carried out for all three X,Y,Z axes, the data so acquired provide all information necessary to also calculate the roll, pitch and yaw errors for each axis. This is done in conventional manner by processing the data with well-known algorithms, such as first taught by Robert Hocken in the article cited above. Therefore, the methodology by which these additional parameters are calculated from the linear positioning and straightness error measurements is not discussed here.

Note that the invention has been described in the figures in terms of the interferometric objective 16 being positioned horizontally (i. e, with its scanning mechanism operating in the XY plane, preferably with the same objective 16 also operating as the probe of the coordinate measuring machine. The same figures exemplify the invention if the objective 16 is an accessory to existing CMMs where the objective is coupled to the measuring arm of the CMM and is used horizontally when measuring the plate 10 for calibration. In such case, the machine can be calibrated rapidly with the optical plate of the invention, as taught herein, without the need for any additional equipment (such as the bulky laser interferometer and its accessories typically used for calibration). The calibration process of the invention can be performed inexpensively on site and by the CMM user.

Those skilled in the art will also readily understand that the use of a grating bonded to the plate of the invention for measuring linear positioning errors, while preferred because of its inexpensive implementation, is not unique because any other approach capable of producing a precise linear measurement in conjunction with the optical plate would be similarly suitable. For example, a different pattern with precisely spaced-apart features could be used as well to acquire the same irradiance measurements detailed above. The patterns could be bonded, etched or engraved. The pattern could also be separate from the plate, so long as in known, fixed spatial relation to the plate or the objective. Instead of a pattern, an interferometric reference signal reflected by the plate (or any other reference surface) could be used as well to measure the exact linear distance traveled by the objective along each axis in relation to a reference surface. Such a reference signal could be produced by the objective 16 by incorporating a narrowband filter for alternative white-light or narrowband operation of the objective, as taught in U.S. Patent Publication No. 2002/0196450, for example.

Thus, a simple approach has been disclosed for calibrating CMMs using a conventional optical flat. The procedure for obtaining the data required to calculate the calibration parameters is simple and well within the capabilities of typical CMM users, so that it can be carried out without the intervention of calibration experts, which is often the case when a laser interferometer is used. Conventional white-light interferometry apparatus can be utilized with a standard optical flat modified as described. In the case of a CMM where the measuring device is an optical topography probe, no additional apparatus is required other than the optical flat. Therefore, the invention can be implemented inexpensively in either case.

While the invention has been shown and described herein in what is believed to be the most practical and preferred embodiments, it is recognized that departures can be made therefrom within the scope of the invention. As mentioned above, while a white-light interferometer has been used throughout to describe the invention, any other optical topography probe and corresponding procedure capable of effecting 3-D measurements of an object could be used in the same manner. Similarly, the invention has been described in terms of a stationary probe (the objective 16 used throughout) and a moveable object stage, but it is understood that the same concept is applicable to a mechanical configuration where the stage is stationary and the probe is mounted on a moveable carriage. Thus, reference to a carriage mechanism capable of multi-directional translation of a probe in relation to an object placed on a target stage is intended to cover both configurations. Therefore, the invention is not to be limited to the details disclosed herein but is to be accorded the full scope of the claims so as to embrace any and all equivalent processes and products.

The invention claimed is:

1. Apparatus for calibrating a coordinate measuring machine, the apparatus comprising:
    an optical topography probe;
    a carriage mechanism for multi-directional translation of the probe in relation to an object placed on a target stage of the coordinate measuring machine;
    an optical plate; and
    a pattern of optically identifiable features spaced apart by a known distance, said pattern being in fixed spatial relation to said plate.

2. The apparatus of claim 1, wherein said pattern is a provided by a grating.

3. The apparatus of claim 1, wherein said optical topography probe is a white-light interferometric objective.

4. The apparatus of claim 1, wherein said optical topography probe is a measurement probe of the coordinate measuring machine.

5. A method for acquiring measurements for calibration of a coordinate measuring machine having a carriage mechanism for multi-directional translation of a probe in relation to an object placed on a target stage, the method comprising the following steps:
    rigidly coupling an optical topography probe to said coordinate measuring machine; and
    carrying out said measurements using an optical plate placed on the target stage and a pattern of optically identifiable features spaced apart by a known distance.

6. The method of claim 5, wherein said pattern is provided by a grating.

7. The method of claim 5, wherein said optical topography probe is a white-light interferometric objective.

8. The method of claim 5, wherein said optical topography probe is a measurement probe of the coordinate measuring machine.

9. The method of claim 5, wherein one of said measurements for calibration is a measurement of linear positioning error of a coordinate axis of the coordinate measuring machine, and said carrying out step includes:
    positioning said pattern in predetermined alignment with the coordinate axis;
    translating the pattern relative to the optical topography probe along the coordinate axis;
    acquiring successive optical measurements of the pattern during the translating step;
    calculating a distance traveled during said translating step based on translation positions identified by processing said successive optical measurements; and
    comparing said distance with a corresponding measurement along the coordinate axis produced by the coordinate measuring machine.

10. The method of claim 9, wherein said pattern is a provided by a grating.

11. The method of claim 9, wherein said optical topography probe is a white-light interferometric objective.

12. The method of claim 9, wherein said optical topography probe is a measurement probe of the coordinate measuring machine.

13. The method of claim 9, wherein said successive optical measurements include irradiance measurements and said translation positions are identified by processing successive irradiance measurements combined with an initial irradiance measurement.

14. The method of claim 5, wherein one of said measurements for calibration is a measurement of a straightness error of a coordinate axis of the coordinate measuring machine, and said carrying out step includes:
    positioning the optical plate on a plane parallel to said coordinate axis;
    translating the plate relative to the optical topography probe along the coordinate axis;
    acquiring successive distance measurements between said optical axis and the plate during the translating step; and
    comparing said distance measurements with corresponding measurements produced by the coordinate measuring machine during said translating step along the coordinate axis.

15. The method of claim 14, wherein said pattern is a provided by a grating.

16. The method of claim 14, wherein said optical topography probe is a white-light interferometric objective.

17. The method of claim 14, wherein said optical topography probe is a measurement probe of the coordinate measuring machine.

18. A method for acquiring measurements for calibration of a coordinate measuring machine having a carriage mechanism capable of multi-directional translation of a measurement probe in relation to an object placed on a target stage, the method comprising the following steps:
   rigidly coupling an optical topography probe to said coordinate measuring machine; and
   carrying out said measurements using an optical reference signal to measure a distance traveled by the optical topography probe in relation to an optical plate placed on the target stage.

\* \* \* \* \*